Jan. 3, 1967
N. T. E. A. BAAK
METHOD FOR CONTROLLING THE RATE OF DEVITRIFICATION
Filed Jan. 2, 1963
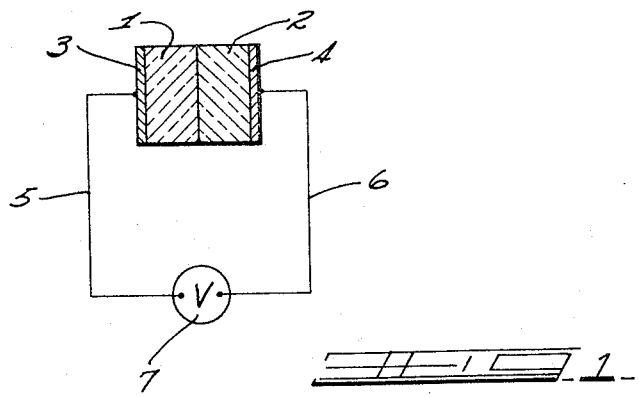
FIG. 1
FIG. 2
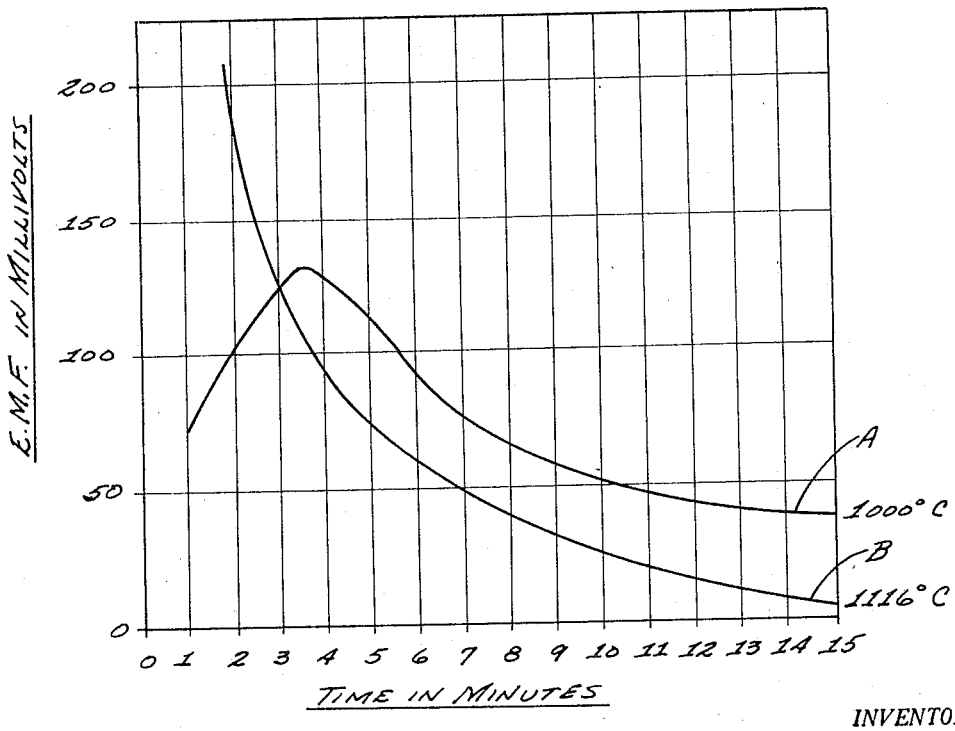
INVENTOR.
NILS TRYGGVE E. A. BAAK Jan. 3, 1967  N. T. E. A. BAAK  3,295,944
METHOD FOR CONTROLLING THE RATE OF DEVITRIFICATION
Filed Jan. 2, 1963  2 Sheets-Sheet 2
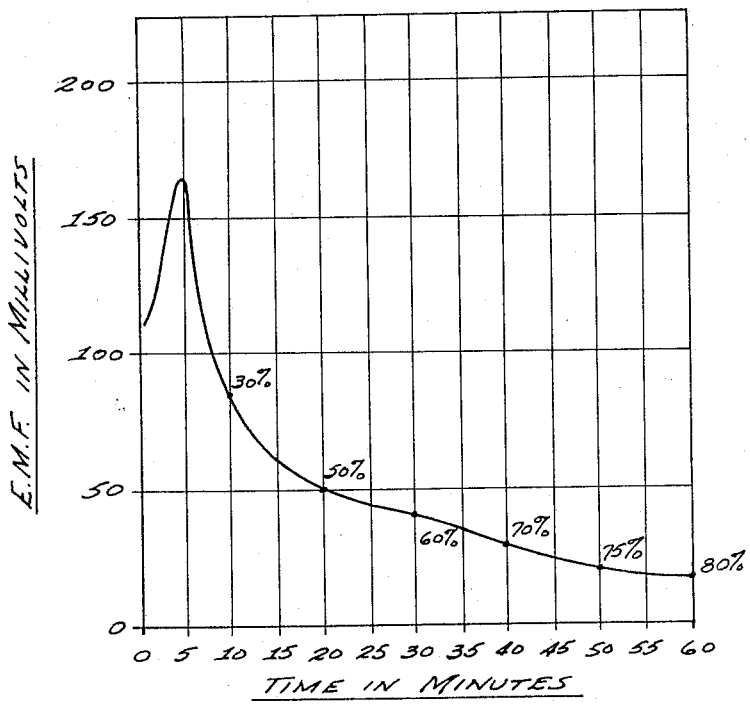
INVENTOR.
NILS TRYGGVE E. A. BAAK

United States Patent Office 3,295,944
Patented Jan. 3, 1967

3,295,944
METHOD FOR CONTROLLING THE RATE OF DEVITRIFICATION
Nils Tryggve E. A. Baak, Toledo, Ohio, assignor to Owens-Illinois, Inc., a corporation of Ohio
Filed Jan. 2, 1963, Ser. No. 248,915
6 Claims. (Cl. 65—29)

This invention relates to a method for accurately measuring and thus controlling the rate of devitrification of a crystallizable vitreous material into a highly crystalline ceramic of high flexural strength. Further, the invention relates to a novel voltage cell for use in such a method. This invention also relates to a method form quickly and accurately testing the composition of a crystallizable vitreous material to insure that the resulting devitrified product is identical to previously produced devitrified products having the required properties.

Devitrified structures consisting essentially of a multiplicity of interlocked inorganic crystals dispersed in a glassy matrix are known. The devitrified or ceramic structure is formed by incorporating a nucleating agent in a vitreous composition and then subjecting the composition to a heat treatment whereby devitrification is initiated and fostered until the composition becomes essentially a crystalline structure, i.e., on the order of 90 to 95% crystalline. The glassy matrix consists essentially of the uncrystallized portion of the glass remaining after crystallization of the crystals. Such devitrified structures have extremely high flexural strength, sometimes on the order of as much as 100,000 to 150,000 pounds per square inch.

Devitrification is preferably accomplished after the vitreous composition is melted and formed into an article of the size and shape desired, so that conventional glass-forming methods, such as pressing, blowing, tube- and rod-drawing, can be utilized. In a known process, described in U.S. Patent 2,920,971, the article is subjected to a temperature range between the maximum nucleation temperature of the nucleating agent ($TiO_2$) and the annealing temperature of the vitreous mass for a sufficient period of time to form nuclei of the crystallizable compounds in the vitreous mass. It is stated that the temperature is then increased to crystallize on the nuclei a major portion, i.e., more than 50 weight percent of the crystallizable compounds at a temperature above the annealing point but below the temperature at which the predominant crystalline phase will redissolve.

In another process, described in copending U.S. application S.N. 846,551, filed October 15, 1959, now Patent No. 3,117,881 issued Jan. 16, 1964, owned by the assignee of the present application, which process is incorporated herein by reference, the vitreous article is maintained at a temperature corresponding substantially to the annealing point (viscosity of log 13.5) and held at substantially the annealing temperature with a variation of from about 20° F. below the annealing temperature to about 50° F. above such temperature for a time sufficient to form submicroscopic crystals of the nucleating agent dispersed throughout the glassy matrix. The article is then maintained at a temperature preferably about 10–30° F. below the fiber-softening point of the composition for a period of time sufficient to develop in the mass a rigid crystalline framework. The article is then maintained at a temperature 150° to 300° F. above the fiber-softening point of the original glass composition for a period of time sufficient to crystallize the articles to the degree desired, preferably 90–95 percent crystalline, but which can vary from 50–98 percent. The principal nucleating agent is $ZrO_2$ which is preferably in admixture with less than 2 weight percent of a secondary nucleant oxide selected from the group consisting of $TiO_2$, CoO, NiO, $V_2O_5$, $MoO_3$, $ThO_2$ and $Fe_2O_3$.

The ceramic or devitrified products thus produced possess a very fine grained and uniform crystalline structure of high flexural strength, enabling articles having extremely thin walls to be produced. Such products have been found to be excellent for various uses, for example, as ovenware, coffee pots, tea pots, dinnerware, and the like. Furthermore, devitrified products have been found to be excellent for use as nose cones for missiles adapted to be fired into outer space and to then reenter the earth's atmosphere. As can be appreciated, such nose cones must be produced with very critical physical properties which enable them to withstand the heat of reentry without destroying the cone or damaging the sensitive instruments contained therein.

Since there are many variables in a devitrification process, including the ingredients added to the raw batch composition for making the initial vitreous melt, the temperatures to which the melt is subjected to initiate and then foster devitrification, the time during which devitrification proceeds, and the like, it has been difficult to produce substantially identical devitrified products when one or more of the variables has changed. Such a change may occur, for example, by obtaining one or more of the raw batch ingredients from a different source.

Heretofore, methods of controlling the devitrification process have included taking samples of the glass melt at the various temperatures and analyzing them to determine the crystalline content and also the nature and size of the crystals that have been formed. This necessitates a rather time-consuming and costly operation involving many separate analyses. Frequently such analyses are not obtained quickly enough and therefore the final products is not of the degree of crystallization originally desired. Furthermore, a change in one or more of the raw batch ingredients results in a change in the devitrification rate so that by subjecting a batch with the different ingredients to the same temperatures and time of a previous batch may result in a product which is not devitrified sufficiently or which has been devitrified beyond the desired point. If the products are for use as nose cones in missiles which must meet strict specifications, such a change may mean the difference between success and failure during reentry of the cone into the earth's atmosphere. Thus, to achieve the best control over a devitrification process, it has been necessary for the operators to rely upon maintaining all factors uniform in the hope that the identical product can be continuously made.

Accordingly, it is an object of the present invention to provide a method for controlling the rate of devitrification of a vitreous crystallizable composition to insure the formation of a product having the desired properties, including the degree of crystallization.

It is another object of this invention to provide a method for controlling the rate of devitrification of a vitreous crystallizable composition so as to produce reramic structures having the same physical properties, thus effecting an accurate quality control thereover.

It is another object of this invention to provide a process whereby changes in successive vitreous crystallizable melts can readily be ascertained and unsatisfactory melts be detected and discarded without having to continue with the devitrification process under actual operating conditions.

Another object of this invention is to provide a novel voltage cell which may be used in measuring and controlling the rate of devitrification of a vitreous crystallizable melt.

In attaining the objects of this invention, one feature resides in measuring the electromotive forces produced by a vitreous devitrifiable mass as it devitrifies over a period of time at a particular temperature range and, using these measurements as a quality control, controlling subsequent devitrification processes of similar compositions by varying the temperature in the lehr, lehr belt speeds, and the like.

Another feature resides in devitrifying a crystallizable vitreous mass while measuring the electromotive forces produced over a period of time and, by comparing such forces with a control, establishing whether the composition of the mass is identical to that of the control.

Still another feature resides in a new and novel voltage cell whereby one component thereof consists of a vitreous crystallizable mass which, as it devitrifies, causes an electromotive force of a particular pattern when charted as a function of time.

Other objects, features, and advantages of the invention will become more apparent from the following discussion, taken in conjunction with the accompanying drawings, wherein FIG. 1 is a cross-sectional view of an embodiment of a voltage cell of the present invention;

FIG. 2 is a graph showing the measured electromotive forces at particular temperatures charted as a function of time; and FIG. 3 is a graph showing electromotive forces measured as a function of time at a particular temperature with corresponding degrees of devitrification placed thereon.

It has been found that an electromotive force can be measured from a cell composed of a disk of a crystallizable vitreous material and a disk of devitrified material held in adjacent relationship at a temperature sufficient to cause devitrification of the vitreous material into a structure consisting essentially of a multiplicity of interlocked inorganic crystals dispersed in a glassy matrix. This electromotive force appears to arise from a difference in energy content between the vitreous mass and the devitrified mass. The potentials which are measured range from several microvolts to more than 100 millivolts and, when the electromotive force is measured as a function of time, the forces can be charted on a graph to give a representative pattern for that particular temperature for the particular composition.

The following examples are to be considered as being merely illustrative of the invention and do not limit the scope thereof in any manner.

*Example 1*

A batch composition consisting of petalite, alumina, silica, titanium dioxide, potash, boric acid, calcined magnesium oxide, and nitre ($NaNo_3$) was mixed in a cone blender mixer and then melted in a platinum crucible held in a gas-fired furnace under oxidizing conditions for 64 hours at a temperature of 1650° C. The molten glass was then removed in the form of glass rods which were pulled from the molten mass by conventional methods and allowed to cool to room temperature. Several glass rods were subsequently devitrified by subjecting them to a temperature of 1000° C. for a period of 17 hours and then allowed to cool to room temperature. A plurality of disks of equal thickness were then cut from the devitrified rods and also from the vitreous rods.

The batch constituents were employed in proportions to make a glass of the following calculated composition in weight percent:

| | |
|---|---|
| $SiO_2$ | 70.2 |
| $B_2O_3$ | 0.1 |
| $TiO_2$ | 4.9 |
| $Al_2O_3$ | 18.5 |
| $MgO$ | 3.0 |
| $Na_2O$ | 0.5 |
| $K_2O$ | 0.1 |
| $Li_2O$ | 2.7 |

A voltage cell similar to that illustrated in FIG. 1 was formed by placing a vitreous disk 1 in contact with a devitrified disk 2 and placing them between platinum disks 3 and 4 having platinum wires or leads 5, 6 connected thereto leading to an electronic voltmeter 7 that did not draw any significant amount of current from the voltage cell.

The cell was then placed in a furnace which was maintained at a temperature of 1000° C., and a reading of the voltage on the electronic voltmeter 7 was taken and charted over a period of 15 minutes. The measured electromotive force is shown in the graph of FIG. 2, as indicated at A.

A similar cell was subjected to a temperature of 1116° C. for a period of 15 minutes, and the measured electromotive force was charted and is also illustrated in FIG. 2, identified as B.

When the electromotive force is measured as a function of time, the behavior generally follows the pattern or curve illustrated in FIG. 2. A number of curves were obtained when the individual voltage cells were maintained at temperatures ranging from 800° C. to 1150° C. and the curves varied from one another depending upon the temperature at which each cell was held, although the general configuration was similar to that illustrated in FIG. 2, namely, a build-up to a peak and a progressively declining line as the disk 1 became devitrified. Rather than complicate the graph of FIG. 2, only two curves are set forth therein. As is evident from FIG. 2, there is first an initial build-up of the electromotive force which may be ascribed to an increase in mobility of charged carriers, together with a reduction of resistance of the mass of disk 1 with temperature. From a time standpoint, this process appears to compete with a fixation of charge carriers in the crystal lattice of disk 2 as compared to their relative mobility in the vitreous mass of disk 1. The electromotive force, therefore, rises to a maximum and then decreases gradually to some constant value. It is this decrease to a constant value which is a measure of the degree of crystallization of the glassy sample. Thus, as the crystal lattice in the vitreous mass 1 builds up, due to devitrification, the electromotive force given off by the vitreous mass decreases to some constant value. As will be appreciated, the divitrification of disk 2 is complete so that the disk does not produce any electromotive force of its own which would otherwise affect the curves of the graph of FIG. 2.

Since a curve representing the electromotive force produced can be formed for each crystallizable vitreous mass as it is devitrified at a particular temperature, and such a curve can be repeated with each identical vitreous composition, the voltage cell of the present invention can be used in a number of ways.

A principal use is for quality control of devitrified structures produced on a mass production basis, whether they be ovenware, coffee pots, nose cones for missiles, or the like. As each group of the vitreous structures is placed in a furnace to undergo devitrification, a voltage cell similar to that of FIG. 1, whose vitreous disk is of the same composition as that of the structures is also placed in the furnace. During the devitrification stage, a continuous reading is made of the electromotive force produced by the cell as the disk 1 and also the other structures in the furnace devitrify. This reading, when charted on a graph, is then compared with a control curve previously made at the same temperature during production of the devitrified structure which is used as the control. If the curves correspond to each other, the operator knows that the devitrified structures are identical to the devitrified control structure. Any substantial change in the E.M.F. curve obtained will, of course, indicate a deviation in the devitrifying process and, depending upon the amount of deviation, the operator is advised that the devitrified structures to that extent are not identical to that of the control.

Another use for the voltage cell of the present invention is to measure the degree of devitrification in the structures being devitrified so as to enable all of the structures to be formed with the desired amount of inorganic crystals in the glassy matrix. For example, a voltage cell similar to that of FIG. 1 is inserted into a furnace together with six disks of the same composition and size as the disk 1 of the cell. As the electromotive force of the cell is measured by the electronic voltmeter, a disk is removed from the furnace at ten minute intervals. By analyzing the six disks for the degree of devitrification, it is possible to chart the results as a graph. FIG. 3 discloses a graph of the electromotive force produced by a vitreous material of the composition of Example 1 at a temperature of 930° C. After ten minutes, the degree of vitrification is 30%. At the end of the hour, the mass is 80% devitrified. If one wants to continuously produce devitrified structures which consist essentially of 75% inorganic crystals in a glassy matrix, all one need do is to place a similar voltage cell in the furnace with the vitreous structures, maintain the furnace at a temperature of 930° C. and take a continuous E.M.F. reading on the voltmeter. When the E.M.F. reaches the level indicated on the graph of FIG. 3 for 75% devitrification, which may or may not be at exactly 50 minutes, depending on a number of factors, the structures are quickly removed from the furnace to stop further devitrification. Thus, by using the voltage cell of the present invention, one can quickly ascertain the degree of devitrification of any structure in the furnace by comparing the produced E.M.F. curve with the curve of a control such as in FIG. 3, where the crystallization percentages are already known.

Still another use for the voltage cell of the present invention is to rapidly check the composition of a vitreous mass to see whether it corresponds in all respects to the control. Thus, if a raw ingredient, such as petalite, is obtained from a different source and a vitreous crystallizable composition is made containing this ingredient, the devitrification properties of the composition can be readily ascertained by forming a disk 1 of the vitreous composition, inserting the disk in a voltage cell, such as disclosed in FIG. 1, and placing the cell in a furnace maintained at a predetermined temperature. The electromotive force produced by the cell is then charted and compared with that of the control previously measured under the same conditions. If there is a definite effect on the devitrification rate of the vitreous composition containing this petalite, the E.M.F. curves will not correspond. Thus, if further use were to be made of the new petalite, a new devitrified control structure would have to be formed and a corresponding E.M.F. curve for this control would have to be obtained, so that future structures would be made in accordance with the new control so as to provide uniform results.

Still another manner in which the E.M.F. produced by a voltage cell can be employed is in automatically regulating the operating conditions so as to increase or decrease the heat within the furnace, as desired, control the speed of the lehr belt carrying the structures, control the time during which the structures are present in the furnace or lehr, etc. Thus, the voltage cell can be connected to an electronic control element (not shown) which, like the electronic voltmeter will draw no current, and, in turn, would operate the switches or relays (not shown) which control the temperature, belt speeds, time, etc. For example, as the electromotive force coming from the voltage cell in the oven is measured, charted, and compared with the E.M.F. curve of the control, any deviation from the control curve can readily be noted and the proper switch made to operate to slightly increase or decrease the temperature so as to increase or decrease the speed of devitrification and enable the measured E.M.F. to return to a curve similar to the control curve. Suitable apparatus for automatically controlling the factors such as temperature, time, lehr belt speeds, and the like, are well known to those in the art and will not be discussed in any detail here. As can be appreciated, in lieu of such apparatus, an operator can read the E.M.F. continuously produced on the voltmeter, record his readings, compare them with the control chart, and manually operate the switches controlling the temperature, time, lehr belt speeds, and the like.

While the disk 2 of the voltage cell is preferably a devitrified material, usually of the same composition as the vitreous material being devitrified, it has been found that other compositions are suitable in forming the cell. While it is not fully understood why there is an electromotive force produced when the voltage cell of the present invention is subjected to high temperatures sufficient to cause devitrification of the vitreous disk over a period of time, it is believed that the E.M.F. is due to the mobility of the oxygen ions from the vitreous disk to the devitrified disk. In a perfect, ideal crystal lattice in which an atom is located in every lattice site there would be no ionic mobility. In real materials, such as a vitreous mass, vacant lattice sites or interstitial ions are always present which contribute to ionic mobility. Since glass is at a higher energy level than the corresponding crystalline phase, the flow of oxygen ions would be from the vitreous to the devitrified mass. As the vitreous mass or disk becomes progressively more crystalline or devitrified, its ionic mobility steadily decreases, thus resulting in a lowered electromotive force in the voltage cell.

It has also been found that the disk 2 of the voltage cell may be a mixture of reagent-grade $ZrO_2$ and $CaCO_3$, which is calcined at 1300° C. to form a solid solution. The material is then compacted and sintered at 2000° C. for about 7 hours to form a stabilized zirconia. Analysis shows that about 4% CaO is in the material, acting as a stabilizer therefor. Since the number of vacancies in the zirconia is higher than in the glass, the ion mobility is from the zirconia to the glass. By keeping the zirconia disk 2 of the cell a constant, E.M.F. curves can be drawn reflecting the potential in the cell during the devitrification of the vitreous disk 1. While such curves differ from those illustrated in FIG. 2, a control curve can be made and used for regulating subsequent devitrification processes to produce uniform products of the quality of the control, in the same manner as described above for the vitreous devitrified disks voltage cell.

The size and thickness of the disks 1 and 2 of the voltage cell must be such that a true indication of the devitrification of structures of the same composition is obtained. Thus, if vitreous coffee pots having a thickness of ⅛ inch are to be devitrified in the furnace, the thickness of the vitreous disk 1 should also be ⅛ inch thick so as to reflect the same devitrification characteristics as the coffee pots.

While the disk 2 of the voltage cell has been disclosed as being either a devitrified material or a stabilized zirconia, it will be evident that any material, such as a refractory metal oxide or silicate, having an energy level different from that of the vitreous mass will be satisfactory in forming the voltage cell.

Having thus disclosed the invention, what is claimed is:

1. A method for measuring the degree of devitrification of thermally crystallizable vitreous shaped articles while said articles are being subjected to a heat treatment in the devitrification temperature range of said vitreous material to produce thermally crystallized articles which comprises subjecting a voltage cell to the same heat treatment as the vitreous articles undergoing devitrification, said voltage cell comprising a pair of plates wherein one of said plates is formed from a crystalline material, the other of said plates being formed from a thermally crystallizable vitreous material having the same chemical composition as said vitreous articles undergoing devitrification, measuring the electromotive force produced by said voltage cell during said heat treatment until the desired degree of devitrification is reached which corresponds to a recorded value of electromotive force and then removing said vitreous articles from said heat treatment, said articles having reached the desired degree of devitrification.

2. In the method as defined in claim 1 wherein said voltage cell comprises a pair of plates wherein one of said plates is formed of zirconia and the other of said plates is formed of thermally crystallizable vitreous material.

3. In the method as defined in claim 1 wherein the crystalline plate is derived by thermal crystallization from the same chemical composition as the vitreous plate.

4. The method of controlling the quality of devitrified articles produced by the devitrification heat treatment of crystallizable vitreous articles by comparing the electromotive force generated during the heat treatment of said articles with a control chart comprising the steps of recording the devitrification characteristics of the vitreous material of said articles by forming a first voltage cell comprising a pair of plates in adjoining contact with each other, one of said plates being a completely crystalline material, the other of said plates being formed from the same vitreous material as said shaped articles, subjecting said plates to the devitrification temperature heat treatment in the devitrification temperature range of said vitreous material so as to crystallize said vitreous plate, measuring the electromotive force generated by said voltage cell during said heat treatment and permanently recording generated electromotive force on a chart as a function of time to form a control curve for said vitreous material at said heat treatment temperature, subjecting said crystallizable vitreous articles to the same devitrifying temperature within the devitrification range of the vitreous material and simultaneously subjecting a second voltage cell comprising a pair of plates identical to said first voltage cell to the identical temperature within the devitrification range of the vitreous material and recording and charging the electromotive force generated by said second voltage cell and comparing the electromotive force of said second voltage cell with the electromotive force of a first voltage cell and ascertaining deviations from the norm of said control chart.

5. A method for measuring the degree of devitrification of thermally crystallizable vitreous shaped articles which comprises forming a plurality of said shaped articles, subjecting said articles to a temperature in the devitrification temperature range of the vitreous material, simultaneously subjecting a voltage cell to the identical temperature, said voltage cell comprising a pair of plates in adjacent contact, wherein one of said plates is a completely devitrified material and the other of said plates being a thermally crystallizable vitreous material, the latter plate being of the same chemical composition as said thermally crystallizable vitreous articles, continuously recording the electromotive force generated by said pair of plates at said devitrification temperature and at given intervals of time, removing one of the shaped vitreous articles undergoing thermal crystallization from the devitrification heat treatment, analyzing said removed article for degree of devitrification and charting the degree of devitrification as a function of time.

6. A method for making a permanent record of the devitrification characteristics of a thermally crystallizable vitreous material while said material is undergoing a heat treatment to produce a devitrified product which comprises measuring the electromotive force produced by the devitrifiable vitreous mass as it devitrifies at a given temperature in the devitrification temperature range of said vitreous mass over a given period of time by forming a plurality of pairs of plates, each pair of plates being in adjoining contact, and each pair consisting of one plate formed of a crystallizable vitreous material and the other of said plates in contact therewith being a devitrified material and having an energy level different from that of the vitreous plate, subjecting each of the said pairs of plates to different temperature in the devitrification temperature range of the crystallizable vitreous material, recording the electromotive force produced by each of said pairs of plates and charting the electromotive force produced for each pair at each temperature as a function of time to form a plurality of curves, one curve for each of said pairs of plates which records the degree of crystallinity of the vitreous material in terms of the electromotive force generated at a given temperature in the devitrification range of said vitreous material.

References Cited by the Examiner

UNITED STATES PATENTS

| | | | |
|---|---|---|---|
| 2,369,189 | 2/1945 | Tillyer | 65—29 |
| 2,443,542 | 6/1948 | Ohl | 65—29 X |
| 3,002,226 | 10/1961 | Warthen | 65—29 |
| 3,055,960 | 9/1962 | Yalom et al. | 136—4 |
| 3,114,066 | 12/1963 | Allen et al. | 65—33 X |

DONALL H. SYLVESTER, *Primary Examiner.*

F. W. MIGA, *Assistant Examiner.*